(12) United States Patent
Mizushita et al.

(10) Patent No.: US 12,142,401 B2
(45) Date of Patent: Nov. 12, 2024

(54) WIRING MEMBER

(71) Applicant: Sumitomo Wiring Systems, Ltd., Mie (JP)

(72) Inventors: Masaki Mizushita, Mie (JP); Daisuke Ebata, Mie (JP); Yuya Fukami, Mie (JP); Kenta Arai, Mie (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 163 days.

(21) Appl. No.: 17/910,924

(22) PCT Filed: Mar. 12, 2021

(86) PCT No.: PCT/JP2021/009964
§ 371 (c)(1),
(2) Date: Sep. 12, 2022

(87) PCT Pub. No.: WO2021/187343
PCT Pub. Date: Sep. 23, 2021

(65) Prior Publication Data
US 2023/0137177 A1   May 4, 2023

(30) Foreign Application Priority Data

Mar. 17, 2020 (JP) .................. 2020-046300

(51) Int. Cl.
*H01B 7/40* (2006.01)
*B60R 16/02* (2006.01)
*H01B 7/08* (2006.01)

(52) U.S. Cl.
CPC .......... *H01B 7/40* (2013.01); *B60R 16/0207* (2013.01); *B60R 16/0215* (2013.01); *H01B 7/08* (2013.01); *H01B 7/0846* (2013.01)

(58) Field of Classification Search
CPC .............. B60R 16/207; B60R 16/0207; B60R 16/0215; H01B 7/08; H01B 7/0846;
(Continued)

(56) References Cited

U.S. PATENT DOCUMENTS 3,761,842 A * 9/1973 Gandrud .................. H04B 3/32
333/236
4,486,619 A * 12/1984 Trine ..................... H01B 11/02
174/34

(Continued)

FOREIGN PATENT DOCUMENTS

JP   61-107110 U   7/1986
JP   S61218000   *   9/1986 ............... H01B 7/08
(Continued)

OTHER PUBLICATIONS

International Search Report issued in Inernational Patent Application No. PCT/JP2021/009964, dated May 11, 2021, along with an English translation thereof.
(Continued)

*Primary Examiner* — Paresh Paghadal
(74) *Attorney, Agent, or Firm* — Greenblum & Bernstein, P.L.C.

(57) ABSTRACT

A wiring member includes: a base member including a holding surface; a wire-like transmission member disposed on a side of the holding surface; and a wire-like member disposed on the side of the holding surface, wherein the wire-like member intersects with the wire-like transmission member at a plurality of positions from a side opposite to the base member, and the wire-like member is fused to the holding surface on both sides of the wire-like transmission member.

9 Claims, 6 Drawing Sheets (58) Field of Classification Search
CPC ...... H01B 7/40; H01B 7/0853; H01B 7/0876;
H01B 7/0045; H02G 3/04; H02G 3/30;
H02G 3/32; H02G 3/266; H02G 3/305
See application file for complete search history.

(56) References Cited

U.S. PATENT DOCUMENTS

| | | | | |
|---|---|---|---|---|
| 2002/0144837 | A1* | 10/2002 | Yamamoto | H01B 7/0876 |
| | | | | 174/117 F |
| 2017/0353029 | A1* | 12/2017 | Austad | H04B 5/70 |
| 2018/0033520 | A1* | 2/2018 | Yoshida | H01B 7/06 |
| 2019/0287696 | A1 | 9/2019 | Mizuno et al. | |
| 2020/0172027 | A1 | 6/2020 | Mizuno et al. | |

FOREIGN PATENT DOCUMENTS

| | | |
|---|---|---|
| JP | 62-256492 | 11/1987 |
| JP | 02-129886 | 5/1990 |
| JP | 2018-085321 | 5/2018 |
| JP | 2019-003925 | 1/2019 |

OTHER PUBLICATIONS

International Preliminary Report on Patentability issued in Inernational Patent Application No. PCT/JP2021/009964, dated Sep. 29, 2022, along with an English translation thereof.
Japan Office Action issued in Japan Patent Application No. 2020-46300, dated Oct. 3, 2023, together with English translation thereof.

* cited by examiner

WIRING MEMBER

TECHNICAL FIELD

The present disclosure relates to a wiring member.

BACKGROUND ART

Patent Document 1 discloses a wire harness including a sheet material, an electrical wire, and a holding part, at least a part of which intervenes between the electrical wire and the sheet material to mediate a bonding between the sheet material and the electrical wire by welding.

PRIOR ART DOCUMENTS

Patent Documents

Patent Document 1: Japanese Patent Application Laid-Open No. 2019-3925

SUMMARY

Problem to be Solved by the Invention

In a case where a material of an outer surrounding of the electrical wire and a surface material of the sheet material are hardly fused to each other, for example, required is that the electrical wire is further easily held on the sheet material.

An object of the present disclosure is to provide a technique capable of easily holding a wire-like transmission member on a base member.

Means to Solve the Problem

A wiring member according to the present disclosure is a wiring member including: a base member including a holding surface; at least one wire-like transmission member disposed on a side of the holding surface; and at least one wire-like member disposed on the side of the holding surface, wherein the wire-like member intersects with the wire-like transmission member at a plurality of positions from a side opposite to the base member, and the wire-like member is fused to the holding surface on both sides of the wire-like transmission member.

Effects of the Invention

According to the present disclosure, the wire-like transmission member can be easily held on the base member.

DESCRIPTION OF EMBODIMENT(S)

Description of Embodiment of Present Disclosure

Embodiments of the present disclosure are listed and described firstly.

A wiring member according to the present disclosure is as follows.

(1) A wiring member includes: a base member including a holding surface; at least one wire-like transmission member disposed on a side of the holding surface; and at least one wire-like member disposed on the side of the holding surface, wherein the wire-like member intersects with the wire-like transmission member at a plurality of positions from a side opposite to the base member, and the wire-like member is fused to the holding surface on both sides of the wire-like transmission member.

Accordingly, the wire-like member fused to the holding surface holds the wire-like transmission member on the holding surface of the base member. Accordingly, the wire-like transmission member can be easily held on the base member.

(2) In the wiring member according to (1), a surface material of the wire-like member may have characteristics that peeling strength of the wire-like member with the holding surface by fusion is larger than peeling strength of the wire-like transmission member with the holding surface by fusion. Even in a case where the wire-like member is hardly fused to the holding surface, the wire-like transmission member is held on the holding surface by the wire-like member easily fused to the holding surface.

(3) In the wiring member according to (1) or (2), the wire-like member may be a wire-like member transmitting electrical power or light. The wire-like member can hold the wire-like transmission member while achieving a function of transmitting electrical power or light.

(4) In the wiring member according to any one of (1) to (3), it is also applicable that the wire-like member includes a plurality of one side route parts disposed on one side of the wire-like transmission member and a plurality of another side route parts disposed on another side of the wire-like transmission member, the plurality of one side route parts and the plurality of another side route parts are alternately provided along an extension direction of the wire-like transmission member, and at least a part of each of the plurality of one side route parts and at least a part of each of the plurality of another side route parts are fused to the holding surface. The wire-like member can hold the wire-like transmission member at a plurality of positions in the extension direction of the wire-like transmission member.

(5) In the wiring member according to any one of (1) to (4), the wire-like member may obliquely intersect with the wire-like transmission member. The wire-like member can extend from a fusion position on the holding surface to obliquely intersect with the wire-like transmission member, thus the wire-like member can be easily disposed.

(6) In the wiring member according to any one of (1) to (5), the wire-like member may be thinner than the wire-like transmission member. The wire-like member is thinner than the wire-like transmission member, thus is easily bended. Thus, the wire-like member can be fused to the holding surface at a position as close to the wire-like transmission member as possible, and the wire-like transmission member is firmly held.

(7) The wiring member according to any one of (1) to (6), it is also applicable that the wire-like transmission member includes a bending route part bended on the holding surface, and the wire-like member intersects with the wire-like transmission member at positions on both sides of the bending route part in an extension direction of the wire-like transmission member. The wire-like transmission member is held by the wire-like member at a front side position and a back side position of the bending route part, thus the wire-like transmission member hardly deviates.

(8) It is also applicable that the wiring member according to any one of (1) to (7) includes the plurality of wire-like transmission members, and the wire-like member is fused to the holding surface while intersecting with the plurality of wire-like transmission members. The plurality of wire-like transmission members are held by the wire-like member.

(9) It is also applicable that the wiring member according to any one of (1) to (8) includes the plurality of wire-like members, and the plurality of wire-like members are fused to the holding surface while intersecting with the wire-like transmission member. The wire-like transmission member is firmly held by the plurality of wire-like members.

(10) In the wiring member according to any one of (1) to (9), it is also applicable that the wire-like transmission member includes a first wire-like transmission member and a second wire-like transmission member, and the wire-like member includes a first wire-like member fused to the holding surface while intersecting with the first wire-like transmission member and a second wire-like member fused to the holding surface while intersecting with the second wire-like transmission member. The first wire-like transmission member is held by the first wire-like member, and the second wire-like transmission member is held by the second wire-like member. Accordingly, the first wire-like transmission member and the second wire-like transmission member are firmly held.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment

Figure 1:
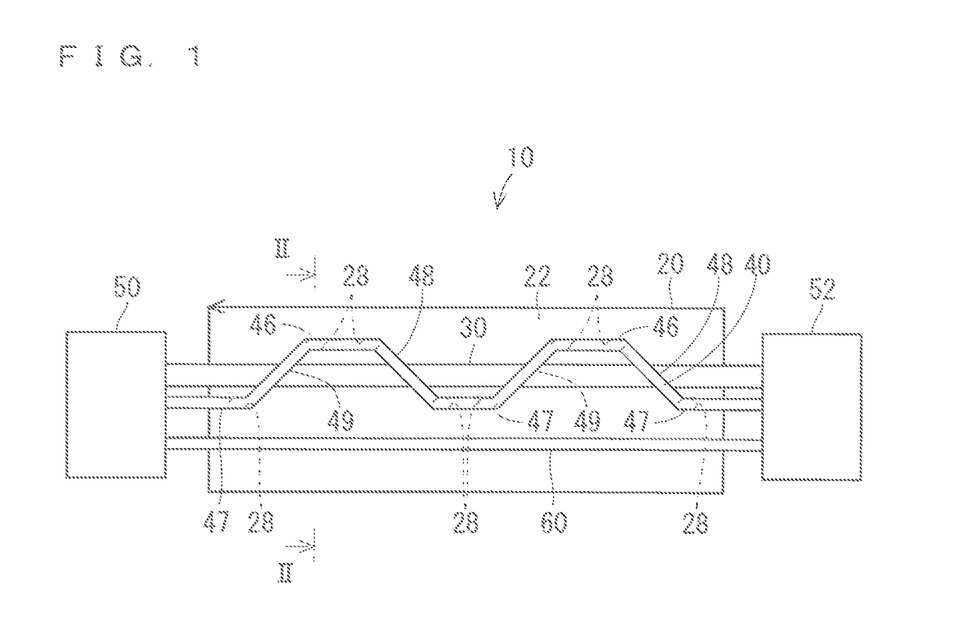
FIG. 1 is a plan view illustrating a wiring member according to an embodiment.
Figure 2:
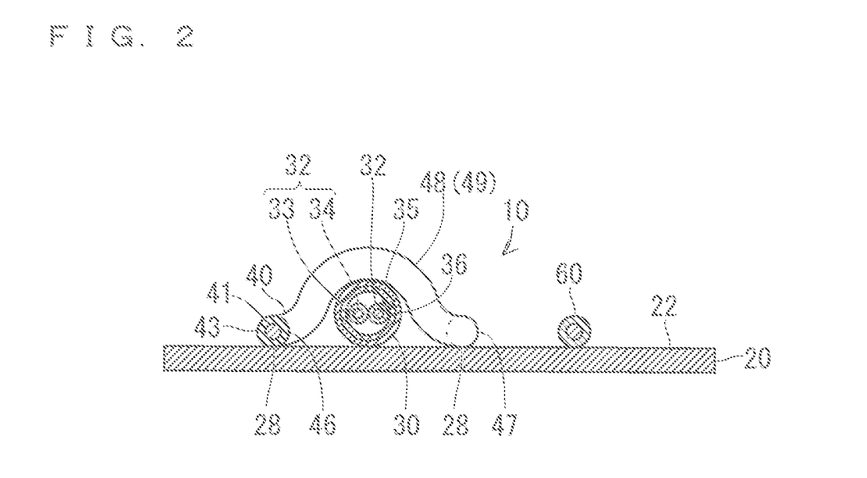
FIG. 2 is a II-II line cross-sectional view in FIG. 1.

A wiring member according to an embodiment is described hereinafter. FIG. 1 is a plan view illustrating a wiring member 10, and FIG. 2 is a cross-sectional view along a II-II line in FIG. 1. The wiring member 10 includes a base member 20, a wire-like transmission member 30, and a wire-like member 40.

The base member 20 includes a holding surface 22. The wire-like transmission member 30 and the wire-like member 40 are disposed on the holding surface 22. The wire-like transmission member 30 is held to form a predetermined route on the holding surface 22. That is to say, the base member 20 is a member having a holding surface 22 holding the wire-like transmission member 30 along the predetermined route. It is sufficient that the base member 20 is a member with the holding surface 22 for holding the wire-like transmission member 30. The base member 20 may be formed into a sheet-like shape or a three-dimensional shape. The holding surface 22 may be a planar surface, a curved surface, a convex-concave surface, or a surface in which a planar surface and a curved surface are combined.

In the description herein, the base member 20 is a member having a flat part, more specifically, a sheet member 20 which can be bended.

The sheet member 20 may be formed into a shape along a wiring route of the wire-like transmission member 30. Herein, the sheet member 20 is formed into a quadrangular shape elongated in one direction. The sheet member may be a bended. The sheet member may have a portion bended to have a curved shape. The sheet member may have a branched portion.

A material constituting the sheet member 20 is not particularly limited, however, the sheet member 20 may be formed of a material containing resin of polyvinyl chloride (PVC), polyethylene terephthalate (PET), or polypropylene (PP), for example. The sheet member 20 may be a sheet material with an inner portion evenly filled or a non-woven sheet, for example. The sheet member 20 may contain a material such as metal. The sheet member 20 preferably has flexibility of being easily bended in a thickness direction. The sheet member 20 may be made up of a single layer or a plurality of stacked layers. When the sheet member is made up of the plurality of stacked layers, it is considered that a resin layer and a resin layer are stacked, for example. More specifically, for example, the sheet member 20 is considered to be made up of a resin sheet material with an inner portion evenly filled and a non-woven sheet stacked on each other. It is also considered that the sheet member 20 is made up of a resin layer and a metal layer stacked on each other, for example.

The wire-like transmission member 30 is assumed to be a wire-like transmission member connecting components in a vehicle so as to be able to perform communication therebetween or supply electrical power. The wire-like transmission member 30 is disposed on a side of the holding surface 22 described above to extend along a wiring route in accordance with a position of a component to which the wire-like transmission member 30 is connected.

More specifically, the wire-like transmission member 30 may be a wire-like member transmitting electrical power or light, for example. For example, the wire-like transmission member 30 may be a general wire having a core wire and a covering around the core wire, or may also be a bare wire, a shielded wire, a braided wire, an enamel wire, a nichrome wire, or an optical fiber.

The wire-like transmission member 30 transmitting the electrical power may be various kinds of signal lines or various kinds of power lines. Some of the wire-like transmission members transmitting the electrical power may be used as an antenna or coil, for example, transmitting or receiving a signal or electrical power to or from a space.

The wire-like transmission member 30 may be a single wire-like object or a composite object of a plurality of wire-like objects (a braided wire and a cable made up of a plurality of wire-like objects covered by a sheath).

The wire-like member 40 is disposed on the side of the holding surface 22 described above. The wire-like member 40 is a member holding the wire-like transmission member 30 on the holding surface 22 in a state of being fused to the holding surface 22.

It is sufficient that the wire-like member 40 can be fused to the holding surface 22. In other words, it is sufficient that a surface material of the wire-like member 40 is a material which can be fused to the holding surface 22 of the sheet member 20. For example, a material of the holding surface 22 of the sheet member 20 and a surface material of the wire-like member 40 may include the same resin material. For example, when the holding surface 22 of the sheet member 20 is formed by a material including PVC, the surface material of the wire-like member 40 may be formed by a material including PVC.

It is sufficient that the surface material of the wire-like member 40 can be fused to the holding surface 22 of the sheet member 20. Thus, a center portion of the wire-like member 40 may be metal, glass, or resin hardly fused to the holding surface 22 of the sheet member 20. Thus, the wire-like member 40 may be a wire-like member transmitting electrical power or light, for example, as with the wire-like transmission member 30. In this case, the wire-like member 40 can be used as a wire-like transmission member connecting components in a vehicle so as to be able to perform communication therebetween or supply electrical power.

Description in the present embodiment is based on an assumption that the wire-like transmission member 30 is a shield cable 30 transmitting electrical power. More specifically, the shield cable 30 includes a plurality of electrical wires 32, a shield layer 35 covering the plurality of electrical wires, and a sheath 36 covering the shield layer 35. The electrical wire 32 includes a core wire 33 and a covering 34 for covering the core wire 33. The plurality of (herein, two) electrical wires 32 are braided. The shield layer 35 has conductivity, and covers the braided electrical wire 32. The shield layer 35 is a braid in which a metal wire is cylindrically braided, for example. The sheath 36 is an insulating layer, and is formed by extrusion-coating melted resin around the shield layer 35. The shield layer 35 may be omitted. The shield cable 30 may also be used as a microphone connection cable, an antenna cable, a video signal transmission cable, a low voltage differential signaling (LVDS) signal cable, for example.

The description is based on an assumption that the wire-like member 40 is an electrical wire 40 transmitting electrical power. More specifically, the electrical wire 40 includes a core wire 41 and a covering 43 for covering the core wire 14.

The shield cable 30 is disposed along a constant route on the holding surface 22. Herein, the shield cable 30 is disposed from one end portion toward the other end portion of the sheet member 20 along an extension direction of the sheet member 20. Herein, the shield cable 30 is linearly disposed along the extension direction of the sheet member 20.

The electrical wire 40 is disposed to intersect with the shield cable 30 at a plurality of positions from a side opposite to the base member 20 on the holding surface 22. The electrical wire is fused to the holding surface 22 on both sides of the shield cable 30. A position in the holding surface 22 where the electrical wire 40 is fused may be a position located away from the shield cable 30 in a plan view or a position having contact with the shield cable 30.

Herein, fusion indicates that resin included in at least one of the wire-like member (electrical wire) 40 and the holding surface 22 of the base member (sheet member) 20 is melted, thereby being stuck and fixed to each other. In performing the fusion, the resin is considered to be melted by heat or a solvent, for example. That is to say, a fusion fixing part by fusion may be in a state of being fused and fixed by heat or a solvent.

The fusion by heat can be performed by ultrasonic fusion, heating pressurizing fusion, hot air fusion, or high-frequency fusion. For example, the fusion part by ultrasonic fusion may also be referred to as an ultrasonic fusion part.

It is also applicable that in the fusion position, only a surface of the wire-like member (electrical wire) 40 is melted, only the holding surface 22 of the base member (sheet member) is melted, or resin included in both members is melted.

As an example of a route in which the electrical wire 40 holds the shield cable 30, in the present embodiment, the electrical wire 40 is disposed from one end side to the other end side of the shield cable 30. The electrical wire 40 includes a plurality of one side route parts 46 disposed on one side of the shield cable 30 and a plurality of other side route parts 47 disposed on the other side of the shield cable 30. The plurality of one side route parts 46 and the plurality of other side route parts 47 are alternately provided along the extension direction of the shield cable 30. At least a part of each of the plurality of one side route parts 46 and at least a part of each of the plurality of other side route parts 47 are fused to the holding surface 22.

In other words, the electrical wire 40 is disposed to intersect with the shield cable 30 at a plurality of positions while repetitively forming a wave shape along the shield cable 30. Then, the electrical wire 40 is fused to the holding surface 22 alternately on one side and the other side of the shield cable 30 along the shield cable 30.

Both end portions of the shield cable 30 and the electrical wire 40 may be connected to connectors 50 and 52. Herein, the connector 50 is provided in a position away from one end portion of the sheet member 20, and the connector 52 is provided in a position away from the other end portion of the sheet member 20. The connectors 50 and 52 may be fixed to the sheet member 20. One end portion of the shield cable 30 (herein, one end portions of the plurality of electrical wires 32) and one end portion of the electrical wire 40 extend from an end portion of the sheet member 20 and are connected to the same connector 50. The other end portion of the shield cable 30 (herein, the other end portions of the plurality of electrical wires 32) and the other end portion of the electrical wire 40 extend from an end portion of the sheet member 20 and are connected to the same connector 52. When the plurality of wire-like transmission members are disposed along the same wiring route in this manner, also applicable is a configuration that a part of the electrical wire 40 holds the other part of shield cable 30.

It is also applicable that the whole one side route parts 46 and the other side route parts 47 in an extension direction thereof are fused to the sheet member 20, or a part of one side route parts 46 and the other side route parts 47 in the extension direction thereof is fused to the sheet member 20. Herein, the one side route part 46 linearly extends along the shield cable 30, and both end portions or the end portion of the one side route part 46 is fused to the sheet member 20 via the fusion part 28. in the similar manner, both end portions or the end portion of the other side route part 47 is fused to the sheet member 20. Accordingly, the one side route part 46 and the other side route part 47 can be easily fused to the sheet member 20 at a fusion position in a spot-like manner. The fusion position in the one side route part 46 and the fusion position in the other side route part 47 are repetitively located in the same pattern along the extension direction of the shield cable 30, thus the fusion in many positions by a mechanical plant, for example, can be easily performed. Both ends of the one side route part 46 and the other side route part 47 are fused to the sheet member 20, thus a route in a portion of the electrical wire 40 where the one side route part 46 and the other side route part 47 are connected to interest with the electrical wire 40 is regulated more reliably. Accordingly, the shield cable 30 is firmly held by the electrical wire 40.

The electrical wire 40 as an example of a wire-like member obliquely intersects with the shield cable 30 as an example of a wire-like transmission member. Herein, a portion where the electrical wire 40 extending from the one side route part 46 toward the other side route part 47 intersects with the shield cable 30 in a case where the electrical wire 40 extends from the connector 50 to the connector 52 is referred to as a first intersection part 48. In contrast, a portion where the electrical wire 40 extending from the other side route part 47 toward the one side route part 46 intersects with the shield cable 30 is referred to as a second intersection part 49. The first intersection part 48 makes an obtuse angle with the one side route part 46 and the other side route part 47. The second intersection part 49 also makes an obtuse angle with the one side route part 46 and the other side route part 47. The first intersection part 48 and the second intersection part 49 need not be continuously formed to make an angle with the one side route part 46 and the other side route part 47. The first intersection part 48 and the second intersection part 49 may be continuously formed while making a curve to the one side route part 46 and the other side route part 47. In any case, when the electrical wire 40 is disposed on the holding surface 22, it is sufficient that the electrical wire 40 is gently bended between the one side route part 46 or the other side route part 47 and the first intersection part 48 or the second intersection part 49, thus the electrical wire 40 is easily disposed on the holding surface 22.

As described above, a configuration of holding the shield cable 30 as an example of the wire-like transmission member by the electrical wire 40 as the other wire-like member may be applied to a case where the shield cable 30 as an example of the wire-like transmission member can be hardly fused to the holding surface 22. For example, the above configuration may be applied to a case where a surface material of the electrical wire 40 as the wire-like member (a material of the covering 43 herein) has the following characteristics in relation to a surface material of the shield cable 30 (a material of the sheath 36 herein) and a surface material of the holding surface 22. The characteristics indicate a case where peeling strength of the electrical wire (wire-like member) 40 by fusion to the holding surface 22 is larger than that of the shield cable (wire-like transmission member) 30 by fusion to the holding surface 22. The peeling strength may be evaluated as follows. For example, the shield cable 30 and the electrical wire 40 are fused to the sheet member 20 in the same condition. For example, the shield cable 30 and the electrical wire 40 are fused to the sheet member 20 by ultrasonic fusion in the same condition of welding pressure, pressure time, and oscillation. Then, the same type of detachment test (for example, a test according to a test regulated by JIS K6854) is performed on the shield cable 30 and the electrical wire 40 from the sheet member 20 to evaluate peeling strength. For example, performed is a 180 degrees detachment test in which the shield cable 30 or the electrical wire 40 are folded back at 180 degrees to the sheet member 20 and pulled or a T-type detachment test in which the sheet member 20 and the shield cable 30 or the electrical wire 40 are pulled to sides opposite to each other in a vertical direction with respect to the fusion surface. The same type of test is performed on the shield cable 30 and the electrical wire 40 to evaluate a magnitude of the peeling strength.

A difference of the peeling strength can be caused by a combination of a constituent material of the holding surface 22 and a surface material of the electrical wire 40 and the shield cable 30. For example, in a case where the holding surface 22 is formed of a material including PVC, considered is a case where the covering 43 of the electrical wire 40 is formed of a material including PVC, and the sheath 36 of the shield cable 30 is formed of a material including resin which does not include PVC such as polyethylene terephthalate (PET), polypropylene (PP), or fluorine resin. The configuration of holding the shield cable 30 by the electrical wire 40 may also be applied as a configuration for holding the wire-like transmission member which can be easily fused to the sheet member 20.

The electrical wire 40 as an example of the wire-like member and the shield cable 30 as an example of the wire-like transmission member may have the same thickness or different thicknesses. When the electrical wire 40 and the shield cable 30 have the different thicknesses, any one of them may be thicker than the other one.

The electrical wire 40 as an example of the wire-like member may be thinner than the shield cable 30 as an example of the wire-like transmission member. Described in the present embodiment is an example that the electrical wire 40 is thinner than the shield cable 30 including the plurality of electrical wires 32. This case has the following advantage. That is to say, the thin electrical wire 40 can be bended more easily than the thick shield cable 30. Thus, when the fusion position is set near the shield cable 30, the electrical wire 40 is flexibly bended in accordance with a diameter of the shield cable 30, and hardly makes large peel force act on the fusion position. Thus, the fusion position of the electrical wire 40 can he set in a position as close to the shield cable 30 as possible to firmly hold the shield cable 30. A wire-like transmission member 60 such as an electrical wire may be additionally disposed on the holding surface 22. This wire-like transmission member 60 may be fused to the holding surface 22.

According to the wiring member 10 having such a configuration, the electrical wire 40 as an example of the wire-like member fused to the holding surface 22 holds the shield cable 30 as an example of the wire-like transmission member on the holding surface 22 of the base member 20. Accordingly, the shield cable 30 can be easily held on the base member 20.

For example, when the surface material of the shield cable 30 is hardly fused to the holding surface 22 of the base member 20, the electrical wire 40 easily fused to the holding surface 22 holds the shield cable 30 on the holding surface 22. An example of a case where the surface material of the shield cable 30 is hardly fused to the holding surface 22 of the base member 20 includes a case where the surface material of the covering 43 of the electrical wire 40 has characteristics that peeling strength of the electrical wire 40 by fusion to the holding surface 22 is larger than peeling strength of the shield cable 30 by fusion to the holding surface 22.

The wire-like member is a wire-like member transmitting electrical power or light, that is the electrical wire 40 herein, thus the electrical wire 40 can hold the shield cable 30 while achieving the function of transmitting electrical wire or light. Accordingly, the shield cable 30 and the electrical wire 40 can be collected to be a thin wiring member.

The plurality of one side route parts 46 and the plurality of other side route parts 47 are alternately provided along the extension direction of the shield cable 30. The plurality of intersection parts 48 and 49 connecting the plurality of one side route parts 46 and the plurality of other side route parts 47 press the shield cable 30 against the holding surface 22 at a plurality of positions and hold the shield cable 30.

The electrical wire 40 can extend to obliquely intersect with the one side route part 46 and the other side route part 47 fused to the holding surface 22, thus an arrangement for the electrical wire 40 is easily performed.

The electrical wire 40 is thinner than the shield cable 30, thus is easily bended. Thus, the electrical wire 40 can be fused to the holding surface 22 at a position as close to the shield cable 30 as possible, thereby being able to firmly hold the shield cable 30.

Modification Example

A modification example based on a premise of the above embodiment is described. The same reference numerals are assigned to the similar constituent elements described in the embodiment, and the description thereof will be omitted.

Figure 3:
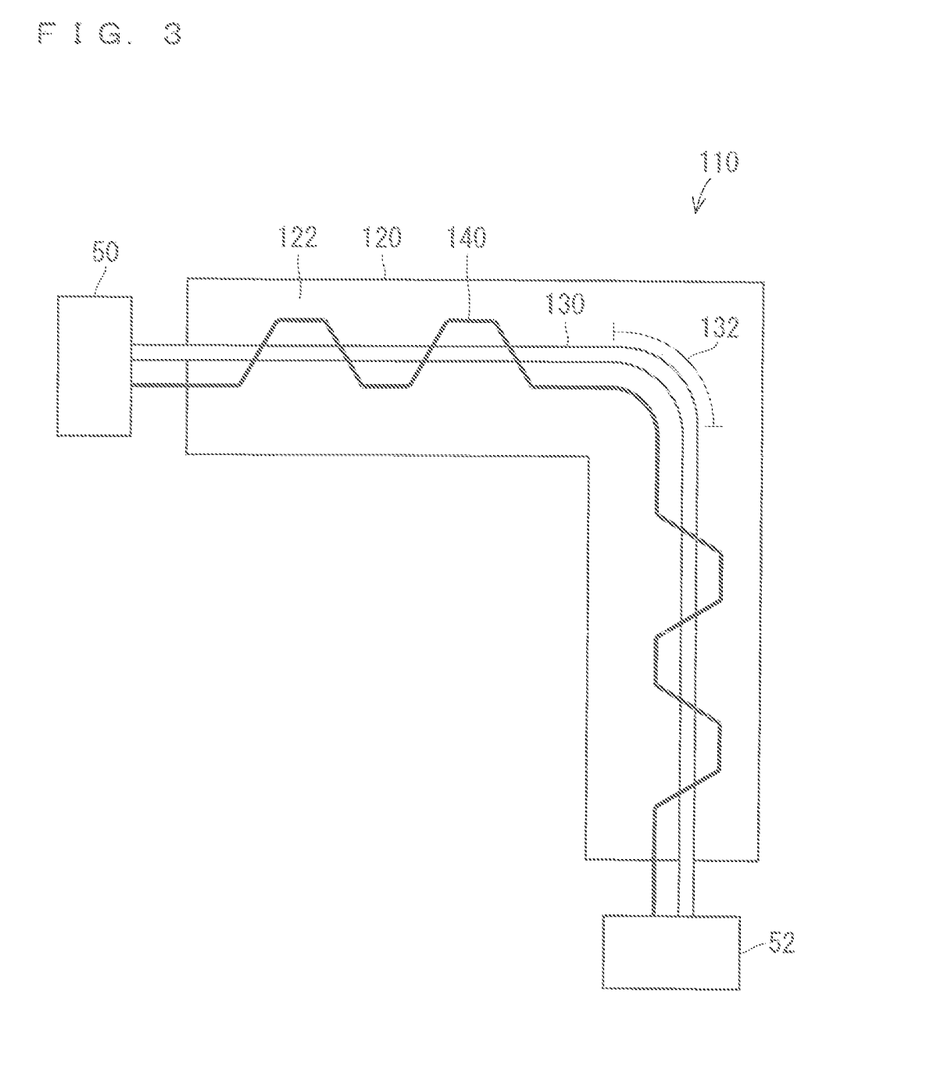
FIG. 3 is a plan view illustrating a wiring member according to a first modification example.

FIG. 3 is a plan view illustrating a wiring member 110 according to a first modification example. As illustrated in FIG. 3, a wire-like transmission member 130 corresponding to the wire-like transmission member 30 may include a bending route part 132 bended on a holding surface 122 corresponding to the holding surface 22. In the first modification example, the base member is a sheet member 120 in the manner similar to the above embodiment. The sheet member 120 is bended and formed into an L-like shape.

The wire-like transmission member 130 is disposed on the holding surface 122 along a route bended into an L-like shape as with a whole shape of the sheet member 120. Both end portions of the wire-like transmission member 130 linearly extend along a straight portion on both end sides of the sheet member 120. The end portions of the wire-like transmission member 130 extend from the end portions of the sheet member 120, and are connected to the connectors 50 and 52. An intermediate portion of the wire-like transmission member 130 in the extension direction is bended in a bending portion of the sheet member 120. Herein, a portion of the wire-like transmission member 130 extending from the bending route part 132 is bended to make an angle of 90 degrees. It is also applicable that the bending route part 132 is bended so that a portion of the wire-like transmission member 130 extending from the bending route part 132 makes an angle larger than 90 degrees and smaller than 180 degrees or makes an angle smaller than 90 degrees. The bending route part 132 may be bended with a corner or a curved line.

A wire-like member 140 corresponding to the wire-like member 40 intersects with the wire-like transmission member 130 at positions on both sides of the bending route part 132 in the extension direction of the wire-like transmission member 130. Herein, the wire-like member 140 intersects with a straight portion of the wire-like transmission member 130 located on an outer side of the bending route part 132. A configuration that the wire-like member 140 holds the wire-like transmission member 130 is similar to the configuration according to the above embodiment. The wire-like member 140 follows the bending route part 132 in a portion following the bending route part 132. The wire-like member 140 may intersect with the bending route part 132.

In the present first modification example, the wire-like member 140 holds both side portions of the wire-like transmission member 130 extending from the bending route part 132 in a constant position in a direction perpendicular to the extension direction thereof. Thus, when viewed as a whole, the wire-like transmission member 130 is positioned in different two directions on the holding surface 122, and the wire-like transmission member 130 is held at a constant position on the holding surface 122.

It is also applicable that the wire-like transmission member 130 is bended at two positions, and extended portions on both outer sides of each bended portion is held by the wire-like member 140 in the extension direction of the wire-like transmission member 130.

Figure 4:
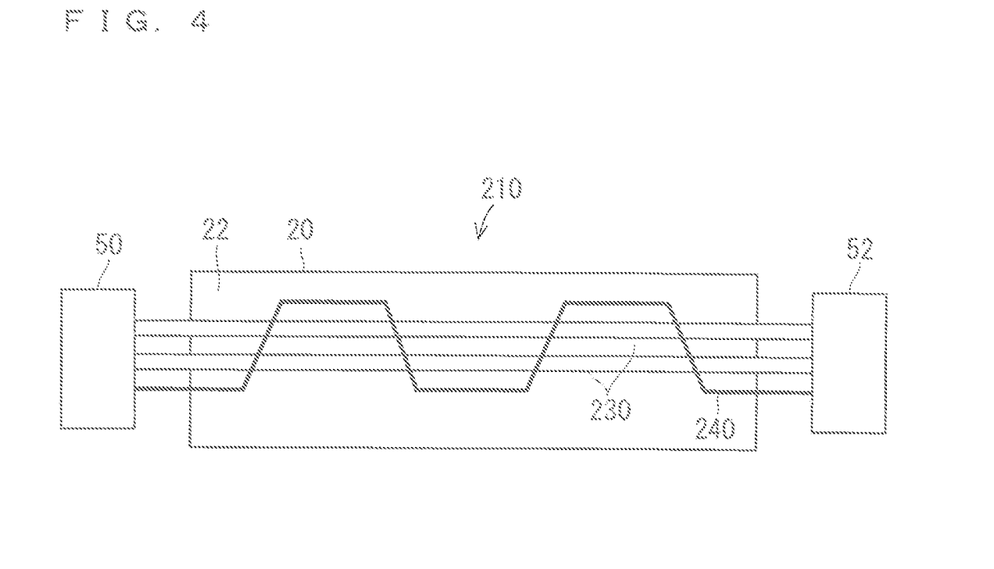
FIG. 4 is a plan view illustrating a wiring member according to a second modification example.

FIG. 4 is a plan view illustrating a wiring member 210 according to a second modification example. As illustrated in FIG. 4, the wiring member 210 may include a plurality of wire-like transmission members 230. The wire-like transmission member 230 may have a configuration similar to the wire-like transmission member 30 described in the above embodiment.

A wire-like member 240 corresponding to the wire-like member 40 may be fused to the holding surface 22 while intersecting with the plurality of wire-like transmission members 230.

In the present example, the plurality of (herein, two) wire-like transmission members 230 are disposed in a parallel state. The plurality of wire-like transmission members 230 may have or may not have contact with each other. The wire-like member 240 is fused to the holding surface 22 in the sheet member 20 on both outer sides of the plurality of wire-like transmission members 230 in a parallel direction. The wire-like member 240 intersects with the plurality of wire-like transmission members 230 between the fusion positions on an outer side of the plurality of wire-like transmission members 230 in a parallel direction, and presses the plurality of wire-like transmission members 230 against the holding surface 22 to hold them.

According to the present example, one wire-like member 240 can hold the plurality of wire-like transmission members 230. A wire-like member 240 may be fused to the holding surface 22 between the plurality of wire-like transmission members 230. In this case, the wire-like member may be disposed along the extension direction of the wire-like transmission member and fused to the holding surface between the plurality of wire-like transmission members. A portion fused to the holding surface 22 and a portion not fused thereto may be mixedly located between the plurality of wire-like transmission members 230 in a plurality of positions connecting one side and the other side of the plurality of wire-like transmission members in the wire-like member.

Figure 5:
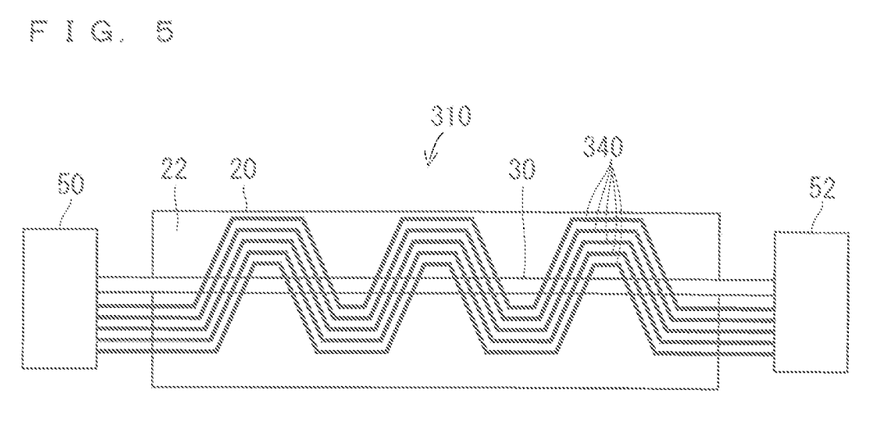
FIG. 5 is a plan view illustrating a wiring member according to a third modification example.

FIG. 5 is a plan view illustrating a wiring member 310 according to a third modification example. As illustrated in FIG. 5, the wiring member 310 may include a plurality of wire-like members 340. The wire-like member 340 may have a configuration similar to the wire-like member 40 described in the above embodiment.

The plurality of wire-like members 340 are fused to the holding surface 22 while intersecting with the wire-like transmission member 30. In the present example, the plurality of (herein, five) wire-like members 340 are disposed to repetitively form a wave shape on both sides of the wire-like transmission member 30 in the parallel state, and fused to the holding surface 22 alternately on one side and the other side of the wire-like transmission member 30. The plurality of wire-like members 340 may have contact with each other, or may be located away from each other.

One end portion or both ends of the plurality of wire-like members 340 may be connected to a connector as a connection destination of the wire-like transmission member 30 at the end portion of the sheet member 20, for example, in the manner similar to the embodiment described above.

According to this example, the wire-like transmission member 30 is firmly held by the plurality of wire-like members 340.

Figure 6:
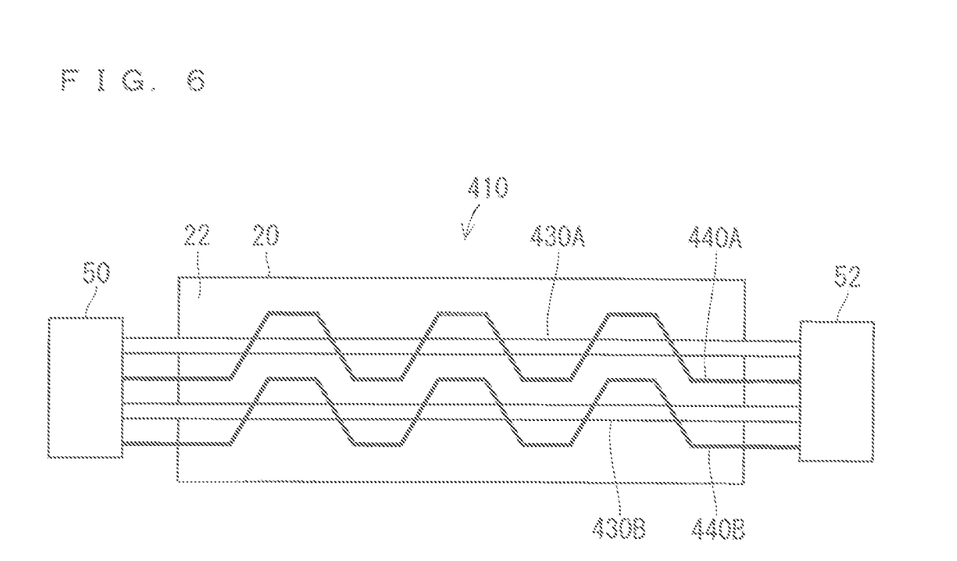
FIG. 6 is a plan view illustrating a wiring member according to a fourth modification example.

FIG. 6 is a plan view illustrating a wiring member 410 according to a fourth modification example. As illustrated in FIG. 6, the wire-like transmission member in the wiring member 410 may include a wire-like transmission member 430A and a second wire-like transmission member 430B. The wire-like transmission members 430A and 430B may have a configuration similar to the wire-like transmission member 30 described in the above embodiment.

The wire-like member in the wiring member 410 may include a first wire-like member 440A and a second wire-like member 440B. The wire-like members 440A and 440B may have a configuration similar to the wire-like member 40 described in the above embodiment. The first wire-like member 440A is fused to the holding surface 22 while intersecting with the first wire-like transmission member 430A to hold the first wire-like transmission member 430A. The second wire-like member 440B is fused to the holding surface 22 while intersecting with the second wire-like transmission member 430B to hold the second wire-like transmission member 430B.

In other words, in the present wiring member 410, the plurality of wire-like transmission members 430A and 430B are held by the separated wire-like members 440A and 440B on the holding surface 22.

According to the present example, the first wire-like transmission member 430A and the second wire-like transmission member 430B are firmly held by the separated wire-like members 440A and 440B.

Each configuration described in the embodiment and each modification example can be appropriately combined as long as they are not contradictory. For example, the holding structure described in the embodiment and the holding structure described in FIG. 4 or FIG. 5 may be mixedly provided in the wiring member.

EXPLANATION OF REFERENCE SIGNS 10 wiring member
20 sheet member (base member)
22 holding surface
28 fusion part
30 shield cable (wire-like transmission member)
32 electrical wire
33 core wire
34 covering
35 shield layer
36 sheath
40 electrical wire (wire-like member)
41 core wire
43 covering
46 one side route part
47 other side route part
48 first intersection part
49 second intersection part
50 connector
52 connector
60 wire-like transmission member
110 wiring member
120 sheet member
122 holding surface
130 wire-like transmission member
132 bending route part
140 wire-like member
210 wiring member
230 wire-like transmission member
240 wire-like member
310 wiring member
340 wire-like member
410 wiring member
430A first wire-like transmission member
430B second wire-like transmission member
440A first wire-like member
440B second wire-like member

The invention claimed is:

1. A wiring member, comprising:
a base member including a holding surface;
at least one wire-like transmission member disposed on a side of the holding surface; and
at least one wire-like member disposed on the side of the holding surface, wherein
the at least one wire-like member intersects with the at least one wire-like transmission member at a plurality of positions from a side opposite to the base member, and
the at least one wire-like member is fused to the holding surface on both sides of the at least one wire-like transmission member,
the at least one wire-like transmission member includes a straight route part that linearly extends in an extension direction,
the at least one wire-like member intersects with the straight route part at a plurality of positions,
the at least one wire-like member includes a plurality of one side route parts disposed on one side of the straight route part of the at least one wire-like transmission member and a plurality of another side route parts disposed on another side of the straight route part of the at least one wire-like transmission member,
the plurality of one side route parts and the plurality of another side route parts are alternately provided along the extension direction of the straight route part of the at least one wire-like transmission member,
at least a part of each of the plurality of one side route parts and at least a part of each of the plurality of another side route parts are fused to the holding surface,
the plurality of one side route parts and the plurality of another side route parts extend in parallel with the straight route part of the at least one wire-like transmission member, and
the straight route part, the plurality of one side route parts and the plurality of another side route parts are spaced from each other in a direction perpendicular to the extension direction of the straight route part of the at least one wire-like transmission member.

2. The wiring member according to claim 1, wherein
a surface material of the at least one wire-like member has characteristics that peeling strength of the at least one wire-like member with the holding surface by fusion is larger than peeling strength of the at least one wire-like transmission member with the holding surface by fusion.

3. The wiring member according to claim 1, wherein
the at least one wire-like member transmits electrical power or light.

4. The wiring member according to claim 1, wherein
the at least one wire-like member obliquely intersects with the at least one wire-like transmission member.

5. The wiring member according to claim 1, wherein
the at least one wire-like member is thinner than the at least one wire-like transmission member.

6. The wiring member according to claim 1, wherein
the at least one wire-like transmission member includes a bending route part bended on the holding surface, and
the at least one wire-like member intersects with the at least one wire-like transmission member at positions on both sides of the bending route part in an extension direction of the at least one wire-like transmission member.

7. The wiring member according to claim 1, wherein
the at least one wire-like transmission member includes a plurality of wire-like transmission members,
the at least one wire-like member is fused to the holding surface on both sides of the plurality of wire-like transmission members in a state that the at least one wire-like member intersects with the plurality of wire-like transmission members.

8. The wiring member according to claim 1, wherein
the at least one wire-like member includes a plurality of wire-like members,
the plurality of wire-like members are fused to the holding surface on both sides of the at least one wire-like transmission member in a state that the plurality of wire-like members intersect with the at least one wire-like transmission member.

9. The wiring member according to claim 1, wherein
the at least one wire-like transmission member includes a first wire-like transmission member and a second wire-like transmission member,
the at least one wire-like member includes a first wire-like member intersecting with the first wire-like transmission member and a second wire-like member intersecting with the second wire-like transmission member,
the first wire-like member is fused to the holding surface on both sides of the first wire-like transmission member in a state that the first wire-like member intersects with the first wire-like transmission member, and
the second wire-like member is fused to the holding surface on both sides of the second wire-like transmission member in a state that the second wire-like member intersects with the second wire-like transmission member.

\* \* \* \* \*